United States Patent
Pallemulle et al.

(10) Patent No.: US 10,936,710 B1
(45) Date of Patent: Mar. 2, 2021

(54) INTERACTION BASED POSTURE ASSESSMENT

(71) Applicant: Amazon Technologies, Inc., Reno, NV (US)

(72) Inventors: Sajeeva Lakmal Bandara Pallemulle, Woodinville, WA (US); Camilla de Oliveira Penna Tavares, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 148 days.

(21) Appl. No.: 15/714,953

(22) Filed: Sep. 25, 2017

(51) Int. Cl.
*G06F 21/44* (2013.01)
*H04L 29/06* (2006.01)

(52) U.S. Cl.
CPC .......... *G06F 21/44* (2013.01); *H04L 63/1425* (2013.01); *H04L 63/1441* (2013.01); *G06F 2221/2103* (2013.01); *G06F 2221/2113* (2013.01); *H04L 63/145* (2013.01)

(58) Field of Classification Search
CPC ............. G06F 21/44; G06F 2221/2103; G06F 2221/2113; H04L 63/1441; H04L 63/1425; H04L 63/145
See application file for complete search history.

(56) References Cited

U.S. PATENT DOCUMENTS

| | | | | |
|---|---|---|---|---|
| 6,185,585 | B1* | 2/2001 | Sequeira | G06F 16/9577 715/201 |
| 2014/0189808 | A1* | 7/2014 | Mahaffey | H04L 63/0853 726/4 |
| 2016/0314187 | A1* | 10/2016 | Poletto | H04L 67/1095 |
| 2016/0371476 | A1* | 12/2016 | Turgeman | G06F 21/31 |
| 2017/0212964 | A1* | 7/2017 | D'anna | G06F 16/986 |

* cited by examiner

*Primary Examiner* — Meng Li
(74) *Attorney, Agent, or Firm* — Hogan Lovells US LLP

(57) ABSTRACT

Various embodiments provide a means of user and/or device authentication by monitoring interaction based posture data received from the client device. Such interaction based posture data may include the particular manner in which a user interacts with the content on the client device or the client device itself, such as scroll patterns, touch pressure, touch duration, elements selected, typing speed, swipes, downloads, among other characteristics that make up a posture profile associated with an authorized user. Thus, interaction data received from the client device that deviates from the posture profile of the authorized user may be used to detect aberrant behavior, which may indicate that the client device has been comprised, such as the client device being used by a user other than the authorized user or the presence of malware. When aberrant behavior is detected a security protocol may be initiated to secure the device.

13 Claims, 10 Drawing Sheets

INTERACTION BASED POSTURE ASSESSMENT

BACKGROUND

Users are increasingly utilizing electronic devices to access content or perform various tasks. Oftentimes these tasks involve sensitive or confidential data associated with an employer or other entity, and should only be accessed or performed by authorized users. Certain security measures may be taken to increase the likelihood that only authorized users are able to gain access. For example, a conventional authentication step may include requiring a user to provide certain credentials (e.g., username and password) before being able to access content or perform some tasks. However, even if such an authentication step were satisfied, it may be difficult to ensure that a current user is the authorized user that provided the credentials, or that the client device has not otherwise been compromised.

BRIEF DESCRIPTION OF THE DRAWINGS

Various embodiments in accordance with the present disclosure will be described with reference to the drawings, in which.

DETAILED DESCRIPTION

Figure 1:
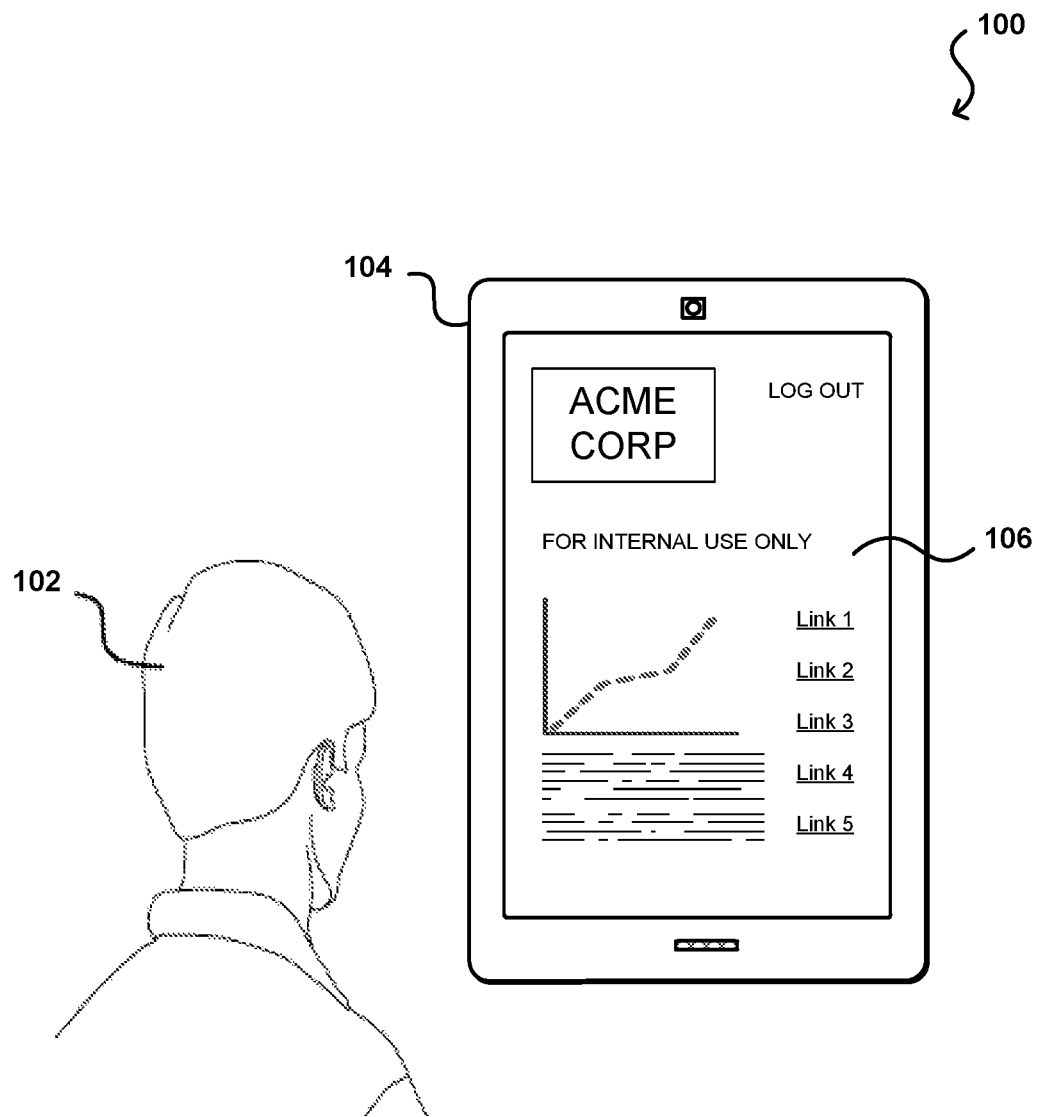
FIG. 1 illustrates an example scenario in which various embodiments of the present disclosure can be utilized.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for securing content in an electronic environment. In particular, various embodiments provide a means of user and/or device authentication by monitoring interaction based posture data received from the client device. Such interaction based posture data may include the particular manner in which a user interacts with the content on the client device or the client device itself, such as scroll patterns, touch pressure, touch duration, elements selected, typing speed, swipes, downloads, the position at which the user holds the device, among other characteristics that make up a posture profile associated with an authorized user. Thus, interaction data received from the client device that deviates from the posture profile of the authorized user may be used to detect aberrant behavior, which may indicate that the client device (or communication with the client device) has been comprised, such as the client device being used by a user other than the authorized user or the presence of malware. When aberrant behavior is detected a security protocol may be initiated to secure the device.

In various embodiments, interaction based posture assessment can be used in conjunction with a remote rendering service, in which content is rendered at a remote server rather than at the client device, and image data of a visual representation of the content is sent to the client device. Thus, the visual representation of the content can be displayed at the client device. However, the user may interact with the visual representation of the content. For example, user inputs to a touch screen of the client device such as taps, swipes, multi-point touches, etc., are sent from the client device to the trusted component where the inputs are translated into respective interactions with the content, such as element selections, page scrolling, zooms, input data, and other such user inputs and requests. The image data sent to the client device can be updated as needed to reflect any changes in the content due to the inputs. This process may occur very quickly such that the user experiences immediate feedback to their inputs.

In various embodiments, the user inputs are one example of interaction data received from the client device that can also be used for authentication through posture assessment. Interaction data may also include any other type of communications from the client device directed to the content host or the trusted component, including requests for content, attempted code injections, attempted downloads and uploads, among others. The combination of certain interaction data received from the client device during authenticated sessions or session durations, may make up a posture profile associated with an authorized user such that the posture model may be used as an authentication layer. In some embodiments, the posture model may be based on (e.g., include, utilize) interaction data collected during the current session. In another embodiment, the posture model may be based on interaction data collected during one or more previous sessions. In some embodiments, passive and continuous authentication may be implemented by monitoring interaction data received from the client device and comparing to the posture model. Thus, aberrant behaviors can be detected, which may indicate that the client device or connection may have been compromised. The interaction based posture assessment may detect both unauthorized users as well as unauthorized software running in the background on the client that is attempting to communicate with the content host as the interaction data may include any data transmitted from the client device to the trusted component or the content host.

In various embodiments, the interaction based posture assessment techniques described herein may be used as a secondary authentication layer following a primary authentication layer. For example the primary authentication layer may include a user login in which the user is required to provide credentials such as a username and a password. In such an example, once the client device is logged in, interactions may be monitored to detect aberrant behavior that may indicate that the client device has been comprised. When it is detected that the interaction data indicates possible aberrant behavior, a security protocol may be initiated. In some embodiments, the security protocol may include issuing an additional authentication challenge to the client device, such as requesting a username or password, and revoking access to content until the authentication challenge is successfully completed.

Typically, passive and continuous authentication may be resource intensive in terms of at least bandwidth and processing costs, among other computing resources, as it often uses a constant stream of data. However, the present techniques make possible passive and continuous authentication with minimal added resources costs as it utilizes data that is already being transmitted and processed for other functions, thereby providing an added layer of security with minimum added resource costs. Network security and minimizing computing resource costs are both challenges that are unique to the realm of computing technology, and the present disclosure provides an improvement to computing technology by aiming to resolve aspects of both of these computing challenges. Accordingly, approaches in accordance with various embodiments improve the operation and performance of the computing device(s) on which they are implemented and with which they communicate.

FIG. 1 illustrates an example scenario 100 in which various embodiments of the present disclosure can be utilized. In this example, an authorized user 102 has logged into a Web service to view content 106 through a client device 104. In some embodiments, this content may include sensitive or confidential data that should only be accessed by the authorized user. Certain security measures may be taken to increase the likelihood that only authorized users are able to gain access. For example, a conventional authentication step may have been required for the device to display the content 106. For example, the user 102 may have been required to provide certain credentials (e.g., username and password) before being able to view content 106 or perform some tasks. However, even if such an authentication step were satisfied, it may be difficult to ensure that a current user is the authorized user that originally provided the credentials, or that the client device has not otherwise been compromised. Systems and methods in accordance with various embodiments of the present disclosure may overcome one or more of these and other deficiencies experienced in conventional approaches for securing content in an electronic environment. In particular, various embodiments provide a means of user and/or device authentication by monitoring interaction based posture data received from the client device 104. Such interaction based posture data may include the particular manner in which a user interacts with the content on the client device 104 or the client device 104 itself, such as scroll patterns, touch pressure, touch duration, elements selected, typing speed, swipes, downloads, among other characteristics that make up a posture profile associated with an authorized user. Thus, interaction data received from the client device that deviates from the posture profile of the authorized user may be used to detect aberrant behavior, which may indicate that the client device (or communication with the client device) has been comprised, such as the client device 104 being used by a user other than the authorized user or the presence of malware. When aberrant behavior is detected a security protocol may be initiated to secure the device.

Figure 2:
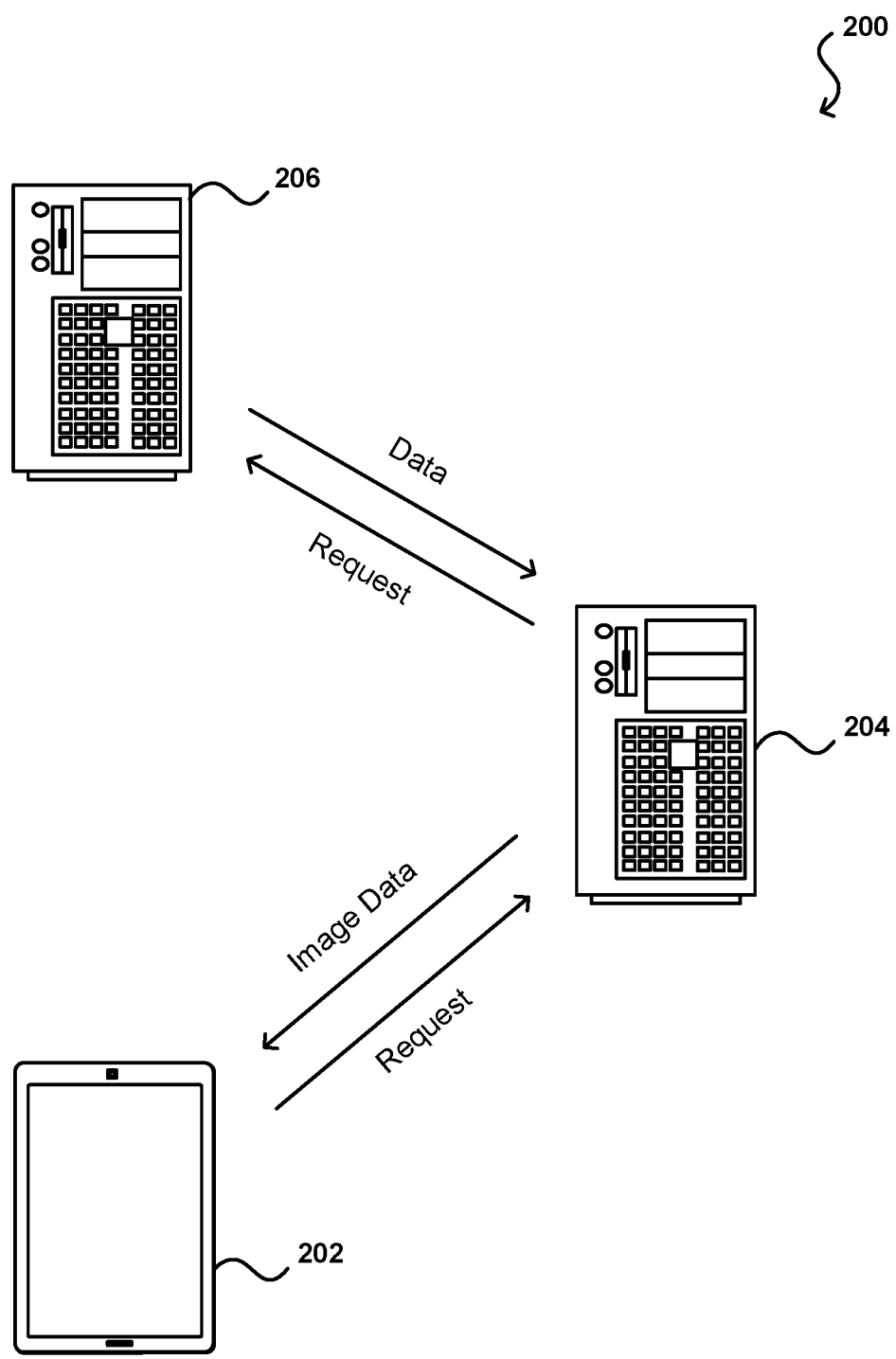
FIG. 2 illustrates an example of a remote rendering configuration that can be used in various example embodiments.

In various embodiments, interaction based posture assessment can be used in conjunction with a remote rendering service, such as a cloud based rendering service. FIG. 2 illustrates an example of such a remote rendering configuration 200, in accordance with example embodiments. A client device 202 may attempt to contact a content host 206 to access a Website or other Web service or content by sending a request, such as a Hypertext Transfer Protocol (HTTP) request, to a content host (i.e., content provider). For example, the request may be made through a browser or application on the client device. However, the request may be routed to a trusted component 204, such as a remote server. In various embodiments, the trusted component may be a virtual machine instance, a peripheral device, a rendering service remote from the client device, a software or hardware component at the content host, among others. The trusted component 204 sends a similar request for the content to the content host 206 and receives a response from the content host 206. Thus, the content host 206 communicates with the trusted component 204 rather than with the client device 202. The response may include data, such as markup language or script (e.g., HTML, JavaScript, CSS, PHP) for rendering the content. The trusted component 204 processes this data to render the content and generates an image of the rendered content. The image data is transmitted to the client device 202 in response to its request for content. Thus, instead of receiving markup language or script (e.g., HTML, JavaScript, CSS, PHP) from the content host and rendering content therefrom, the client device 202 receives image data (e.g., JPG, TIF, PNG, GIF) from the trusted component, and renders a visual representation of the content from the image data.

Figure 3:
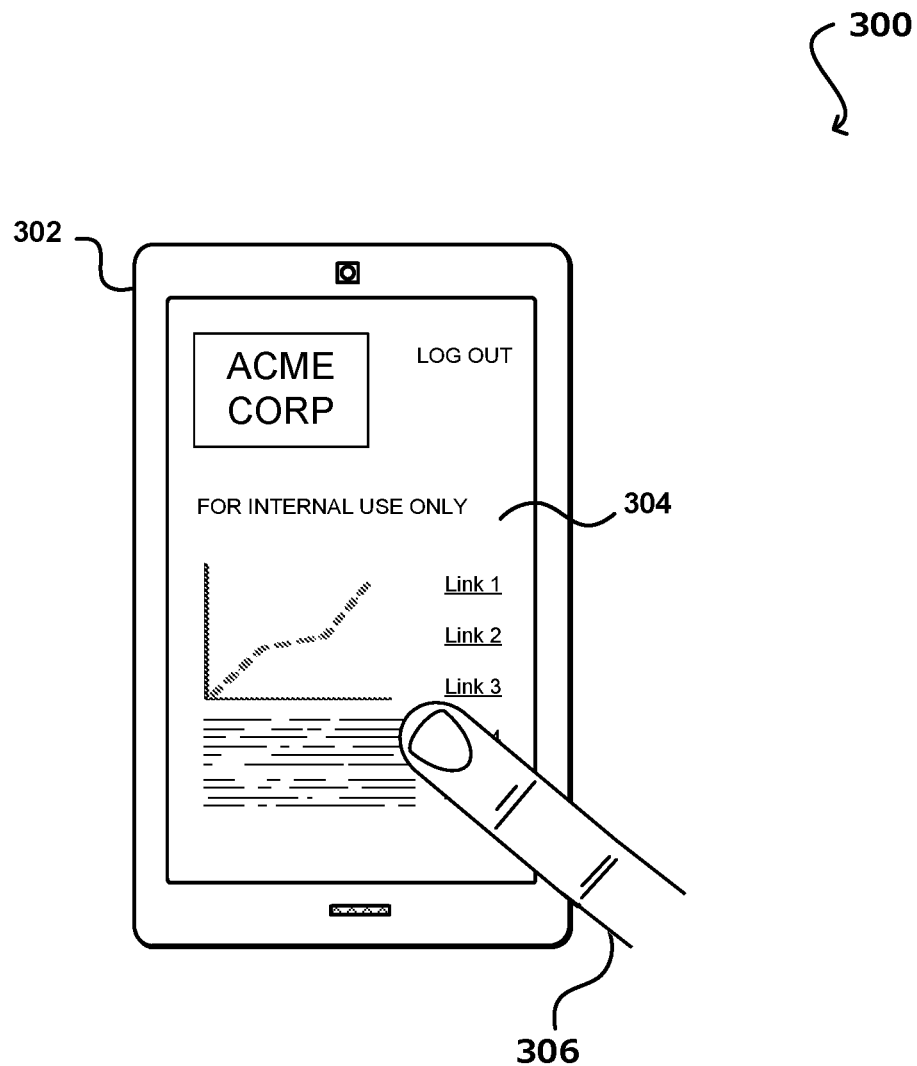
FIG. 3 illustrates an example scenario in which a client device displays a visual representation (i.e., image) of content, in accordance with various embodiments.

FIG. 3 illustrates an example scenario 300 in which a client device 302 displays a visual representation (i.e., image) of the content 304. However, from the perspective of a user 306 of the client device, the difference between displaying a visual representation of the content 304 and rendered content may be indistinguishable, and the user 306 may still interact with the visual representation of the content 304 in the same manner. For example, the user 306 may make certain gestures, scroll, click on links, zoom, type characters, among other tasks. In various embodiments, the client device 302 is treated similar to a terminal interfacing device with input and output devices (e.g., display, touch screen, mouse, keyboard, trackpad), and the trusted component 204 (FIG. 2) acts as the processor or browser. For example, user inputs to a touch screen of the client device such as taps, swipes, multi-point touches, etc., are sent from the client device 302 to the trusted component as interaction data where the inputs are translated into respective interactions with the content, such as element selections, page scrolling, zooms, input data, and other such user inputs and requests. The content rendered at the trusted component may change depending on the inputs received from the client device and the trusted component may generate new image data reflective of the updated content if needed, and transmit the updated image data to the client device 302. This process may occur very quickly such that the user experiences immediate feedback to their inputs.

Rendering the content at a remote rendering service may be advantageous for several reasons, including resource utilization and decreased security vulnerability. For example, processor(s) and storage at the remote rendering service may have higher capacity than the client device, which allows content to be rendered faster. Transmission of image data as opposed to all the data needed for rendering content may require less bandwidth, particularly where the image data can be in a compressed format. Additionally, routing requests and interacts from the client device aimed at the Web service through a trusted component allows a layer of security, as requests or interactions that are suspicious may be detected by the trusted component, for example, such as by using the interaction based posture assessment techniques of the present disclosure.

Figure 4:
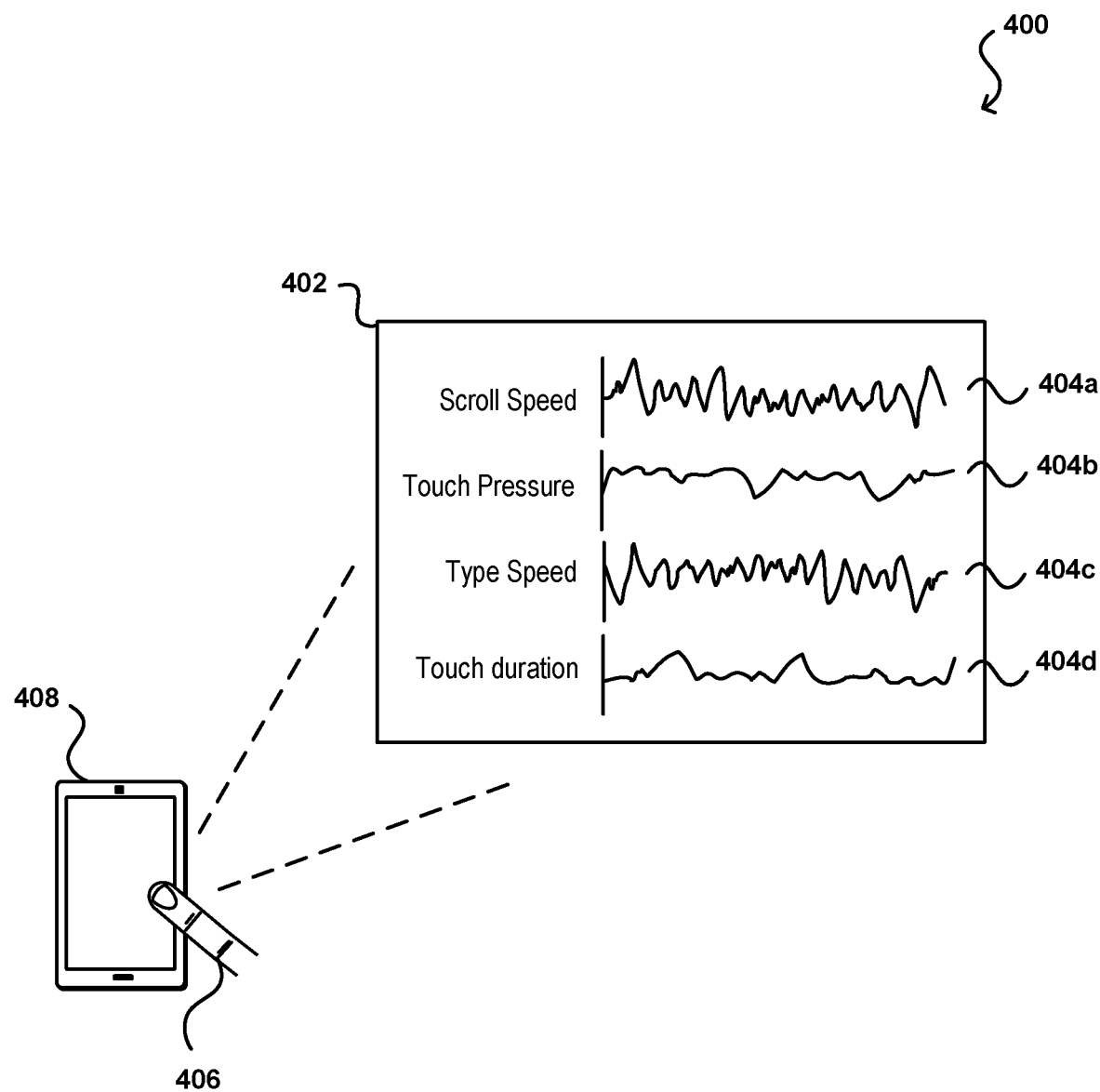
FIG. 4 is an example representation of a posture profile that includes example user input parameters, in accordance with various embodiments.

In various embodiments, the user inputs received from the client device 302 for interfacing with the visual representation of the content 304 can also be used for authentication. FIG. 4 is an example representation 400 of a posture profile 402 that includes example user input parameters 404a, 404b, 404c, 404d. As discussed, the way a user 406 interacts with the client device 408 may have certain characteristics. For example, the user 406 may scroll with a certain pattern or speed, or have a tendency to click on certain types of links, or have certain typing characteristics. User inputs are one example of interaction data received from the client device 408. Interaction data received from the client device 408 may also include any other type of communications directed to the content host or the trusted component, including requests for content, attempted code injections, attempted downloads and uploads, among others. Interaction data is an example type of posture data that can be used to continuously monitor and authenticate the user or device. Specific components of interaction data (e.g., scroll speed, tap duration, element selection) may be considered posture parameters. In some embodiments, posture data may also include posture parameters such as metadata of the client device, such as operating system, apps installed, geo-location, rooting status, hardware and software components, device type, among others. Analysis of a set of such parameters can be performed to determine if access can be granted to such a device. In some embodiments, this may be one security layer among multiple security layers.

The combination of certain posture parameters, including interaction data from authenticated sessions or session durations, may make up a posture model (e.g., profile, signature), such as posture profile 402, associated with an authorized user such that the posture model may be used to authenticate the user and/or device. In some embodiments, passive and continuous authentication may be implemented by monitoring posture parameters, including received interaction data, of the client device and comparing the most recent posture parameters to the posture model. Thus, aberrant behavior can be detected, which may indicate that the client device or connection may have been compromised. In some embodiments, the posture model may be based on (e.g., include, utilize) interaction data collected during the current sessions. In another embodiment, the posture model may be based on interaction data collected during one or more previous sessions. In some cases, a history of interaction data may be collected and a robust posture model can be built for the user account.

In some embodiments, an acceptable value range may be determined for each posture parameter in a set of posture parameters, and interaction data that includes one or more values that are out of range of the acceptable value range for the respective posture parameter may be indicative of aberrant behavior. The determination of aberrant behavior may be set to be triggered by a variety of combinations of detected posture parameter values. For example, a speed range of 2-10 lines of text per second (or another range) may be determined to be acceptable for the posture parameter of scroll speed. As the interaction data from the client device is monitored, if scroll speed that falls outside of the acceptable range is detected, a determination of aberrant behavior may be made. In some embodiments, an error margin may be added to or included in the acceptable speed range. In some embodiments, a certain combination of out-of-range posture parameters are required to make a determination of aberrant behavior. For example, a typing speed of 60-80 words per minute may be determined to be acceptable for the posture parameter of typing speed. In another example, an upper limit of 3 file downloads per hours may be determined to be acceptable for the posture parameter of download frequency. In another example, an tap duration of 0.5 seconds to 1.5 seconds may be acceptable for the posture parameter of tap duration. In some embodiments, the degree to which a value falls outside of the acceptable value range may influence the determination.

The posture profile 402 of FIG. 4 is an example of a posture model, which may take on various other forms. For example, in some embodiments, the posture model may be a trained model that can be used to analyze interaction data received from a client device to determine if the interaction data is aberrant or indicates aberrant behavior with respect to a certain user account. For example, the posture model may be trained using a first set of interaction data associated from the user account. The first set of interaction data may include interaction data that is trusted to be associated with the user account. Thus, the first set of interaction data may serve as examples of what interaction data should look like when the device is secure (e.g., being used by an user authorized to the user account). In some embodiments, there may be a large number of posture parameters that may contribute, in varying strengths, to the classification between acceptable behaviors and aberrant behaviors. Thus, a machine learning based technique may be employed. For example, the posture model may include a neural network trained using the first interaction data and which can be used to classify new interaction data as associated with acceptable behaviors or aberrant behaviors.

In various embodiments, the posture model may include a plurality of posture parameters that are applicable across different types of devices, such as smartphones, laptops, desktop computers, and tablets, among others. Thus, the posture model can be used for authentication across the different types of devices. For example, an authorized user may use a smartphone to request content and later switch to a desktop computer. The posture model may be used for authentication for both devices. In some embodiments, the posture model may include posture parameters that are applicable to both types of devices, such as type of content requests, frequency of requests, among others. The posture model may also include some posture parameters that are specific to a certain type of device. Continuing with the above example, the posture model may include some posture parameters that are specific to a smartphone, such as touch pressure, swipe pattern, etc., and some posture parameters that are specific to a desktop computer, such as mouse movement patterns and keyboard type patters. Thus, corresponding posture parameters of the posture model can be used for authentication based on the device type. Alternatively, in some embodiments, more than one posture model may be associated with a user account, in which each of the posture models corresponds to a different type of device and the corresponding posture model is used for authentication based on the detected device type. In various embodiments, if a new device type is detected, a posture model may be generated based on the interaction data coming from the new device during the current session with the new device. In certain such embodiments, some posture parameters associated with other devices may be carried over and applied to the new device if such parameters are relevant to the new device.

The interaction based posture assessment may detect both unauthorized users as well as unauthorized software running in the background on the client that is attempting to communicate with the content host as the interaction data may include any data transmitted from the client device to the trusted component or the content host. In an example scenario, an authorized user logs into their account on a client device and gains access to content. The authorized user then sets the device down without logging out of the device or locking the device and the device is picked up by a young child who begins to play with the device, including touching the touch screen display, pressing buttons, etc., in a manner that is different than if the authorized user were interacting with the device. Such inputs are received as interaction data. Thus, the interaction data receive while the child is playing with the device may be inconsistent with the interaction data received when the authorized user is using the device. Thus, such interaction data may be detected as indicated aberrant behavior and the security protocol may be initiated. In another example scenario, the interaction data may include uploads from the client device and downloads to the client device. In an example scenario, it may be detected, through the interaction data, that an unusual amount of content is being downloaded to the client device. This may be done either by an unauthorized user or by malware on the client device or through another client device posing as the authenticated device. Thus, such interaction data may be detected as aberrant behavior.

In various embodiments, since the trusted component renders the content of which the user of the client device is seeing a visual representation, the trusted component may be aware of what type of interaction data should be received from the client device. For example, the content may be a simple HTML Webpage that is scrollable and includes selectable links at specific positions. Thus, the interaction data that is expected and which would be appropriate for such content may include a certain amount of scrolling, selection input (e.g., click, touch) at regions of the display corresponding to the links, and the like. However, if the received interaction data falls outside of the expected range of interaction data, or if contradictory interaction data is received, it may be detected as indicating aberrant behavior. For example, continuing with the above example, if the received interaction data includes requests to download content when there is no option to download content on the Webpage, such requests may be coming from an unauthorized source. Thus, the security protocol may be initiated.

In various embodiments, interaction based posture assessment, as described above, among other embodiments, may be used as a secondary authentication layer following a primary authentication layer. For example the primary authentication layer may include a user login in which the user is required to provide credentials such as a username and a password. In such an example, once the client device is logged in, interactions may be monitored to detect aberrant behavior that may indicate that the client device has been comprised.

A discussed above, aberrant behavior can be detected in a variety of ways using interaction data. When it is detected that the interaction data indicates possible aberrant behavior, a security protocol may be initiated. In some embodiments, the security protocol may include issuing an additional authentication challenge to the client device, such as requesting a username or password, and revoking access to content until the authentication challenge is successfully completed. In some embodiments, the security protocol is initiated or implemented by the trusted component. For example, the trusted component may revoke access to the image data representing the content. The trusted component may issue the authentication challenge and receive credentials from the client device in response to the authentication challenge. The trusted component may perform the authentication using the credentials or provide the credentials to an authentication service. In the latter scenario, the trust component may receive the results of the authentication from the authentication service and respond to the client device accordingly. In some embodiments, the session may be preserved during the authentication challenge for at least a certain period of time such as that the user may resume their activity after completing the authentication challenge with minimal disruption. In some embodiments, the security protocol may include logging the device out of the account, and the use must log back into the account to continue to access the content.

In some embodiments, different security protocols may be initiated based on the type of aberrant behavior detected. For example, aberrant behavior based solely on user input data such as scroll speed, type speed, etc., may cause a low level security protocol to be initiated, such as issuing a simple authentication challenge such as providing a password. In another example, aberrant behavior based on detecting an HTTP request being sent from the client device and received directly by the content host may potentially indicate a more severe issue. Thus, a high level security protocol may be initiated in response to detecting such an event. The high level security protocol may include, for example, logging the client device out of the account, revoking access to the network, and requiring a waiting period before permitting the client device to log back in or regaining access to the network. The security protocol may also include generating and sending notifications, flags, reports, etc., of detected aberrant behavior.

Figure 5:
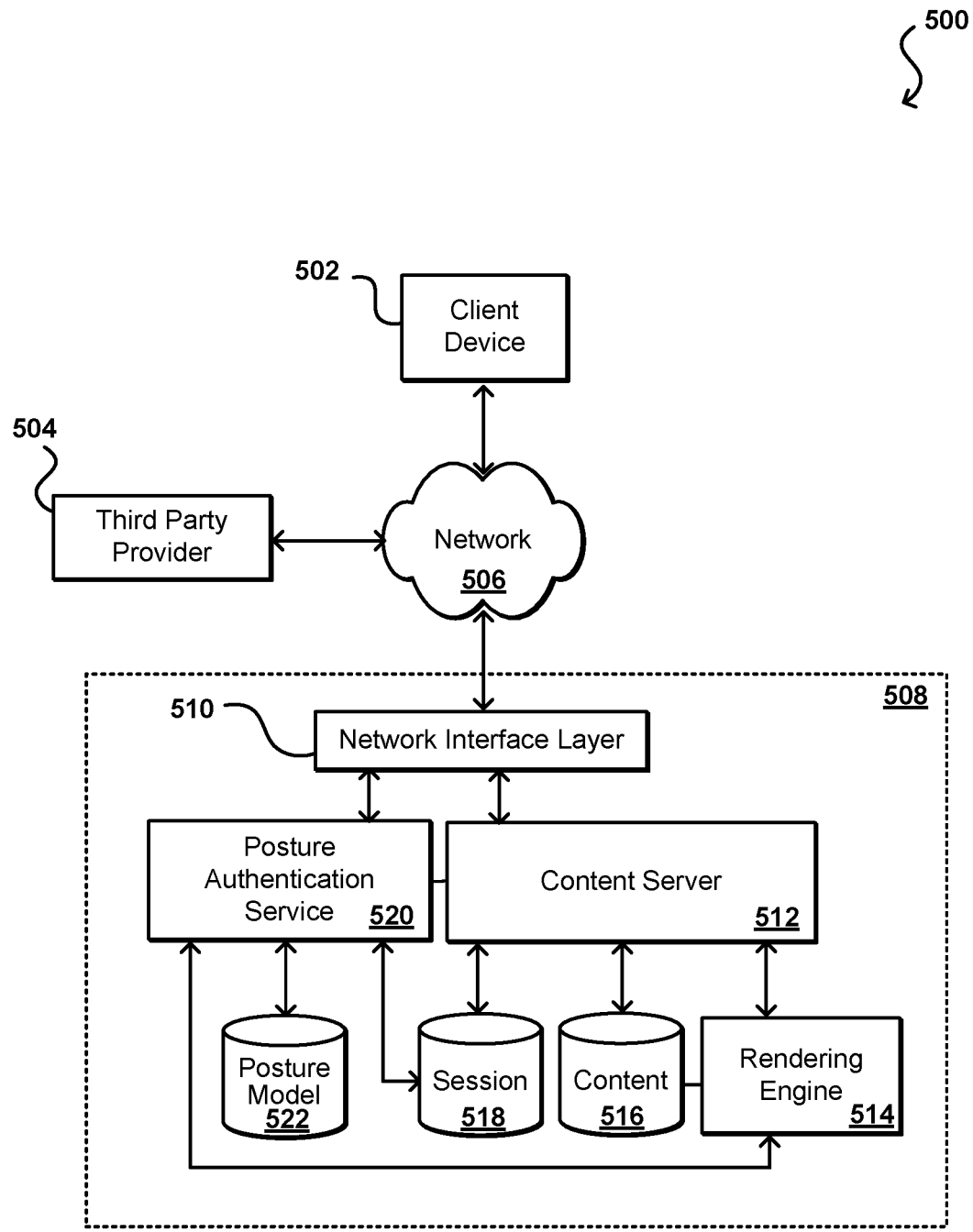
FIG. 5 illustrates an example system in which aspects of the various embodiments can be implemented, in accordance with various embodiment embodiments.

FIG. 5 illustrates an example system 500 in which aspects of the various embodiments can be implemented. In this example, content is to be rendered on a client device 502 and posture data received from the client device 502 can be used for authentication. Although a portable computing device may be described in various examples, it should be understood that any appropriate device can be used to present content in accordance with the various embodiments, as may include notebook computers, personal data assistants, e-book readers, cellular phones, video gaming consoles or controllers, smart televisions, set top boxes, a wearable computer (e.g., a smart watch, contacts, or glasses), an augmented or virtual reality device, and portable media players, among others. In this example, the content displayed on the client device 502 may include a visual representation (image rendered from image data) of a Web page or Web application. The visual representation can be displayed through a browser application, content rendered by an application from a content provider or third party application provider 504, among other types of content. The visual representation can be generated and provided to the client device 502 via a resource provider environment 508, for example, as may be received over a least one network 506, such as the Internet, an intranet, a local area network, a cellular network, or another appropriate wired and/or wireless network.

The service provider 508 may be associated with (e.g., include, included in, coupled to) a trusted component such as a remote server. The service provider 508 may receive data, such as markup language or script (e.g., HTML, JavaScript, CSS, PHP) from a third party provider 504 (i.e., content provider) from which Web content can be rendered. The data may be received via a network interface layer 510, which can include one or more interfaces such as application programming interfaces (APIs) for receiving requests, as well as various other network components such as routers, load balancers, and the like. The content can be rendered using a rendering engine on the client device in some embodiments, but in a majority of embodiments can be rendered using a rendering engine 514 in the resource provider environment 508, such that image data is transmitted to the client device 502 instead of actual data stored in, or accessible by, the resource provider environment 508. In this example, at least some of the content can be pulled from a content repository 516 and rendered by a rendering engine 514 before being provided to the client device 502 by at least one content server 512. An application on the client device can then cause the image data of the content to be displayed through an appropriate interface of the client device. In at least some embodiments the content server 512 or another appropriate component can cause data to be written to at least one log or session repository 518, as may include information regarding the content served and actions performed with respect to that content, among other such options.

In various embodiments, posture data from the client device is received at the resource provider environment 508 via the network interface layer 510. The posture data may include interaction data, such as user inputs to the client device. For example, a user may scroll with a certain pattern or speed, or have a tendency to click on certain types of links, or have certain typing characteristics. User inputs are one example of interaction data received from the client device. Interaction data received from the client may also include any other type of communications directed to the content host or the trusted component, including requests for content, attempted code injections, attempted downloads and uploads, among others. Interaction data is an example type of posture data that can be used to continuously monitor and authenticate the user or device. In some embodiments, posture data may also include posture parameters such as metadata of the client device, such as operating system, apps installed, geo-location, rooting status, hardware and software components, device type, among others.

Posture data may be received to the posture authentication service 520. In some embodiments, a posture model 522 is stored at or accessible to the resource provider environment 508. The posture model may include a combination of certain posture parameters and may be used to authenticate the user and/or device. The posture model may include interaction data from authenticated sessions or session durations associated with an authorized user and/or an authorized session. In some embodiments, the posture model may be based on (e.g., include, utilize) interaction data collected during the current sessions. In some embodiments, this information can be stored in session repository 518, a log data store, or other such location, which might contain additional information for the time and location at which the image content was displayed, as well as potentially information about the user or any other persons present at the determined time.

In another embodiment, the posture model may be based on interaction data collected during one or more previous sessions. In some cases, a history of interaction data may be collected and a robust posture model can be built for the user account. Thus, the posture authentication service 520 can monitor posture data from the client device in real-time (including quasi-real time or accounting for processing lag and/or hardware/software limitations), and compare the received posture data to the posture model 522. Thus, the posture authentication service 520 can detect aberrant behavior and trigger a security protocol. In some embodiments, when a security protocol is triggered, the content server 512 may send, for example, an authentication challenge to the client device 502 such as a prompt to provide credentials such as a username and password. Depending on the security protocol, the content server 510 may send various data to the client device to implement the security protocol.

Figure 6:
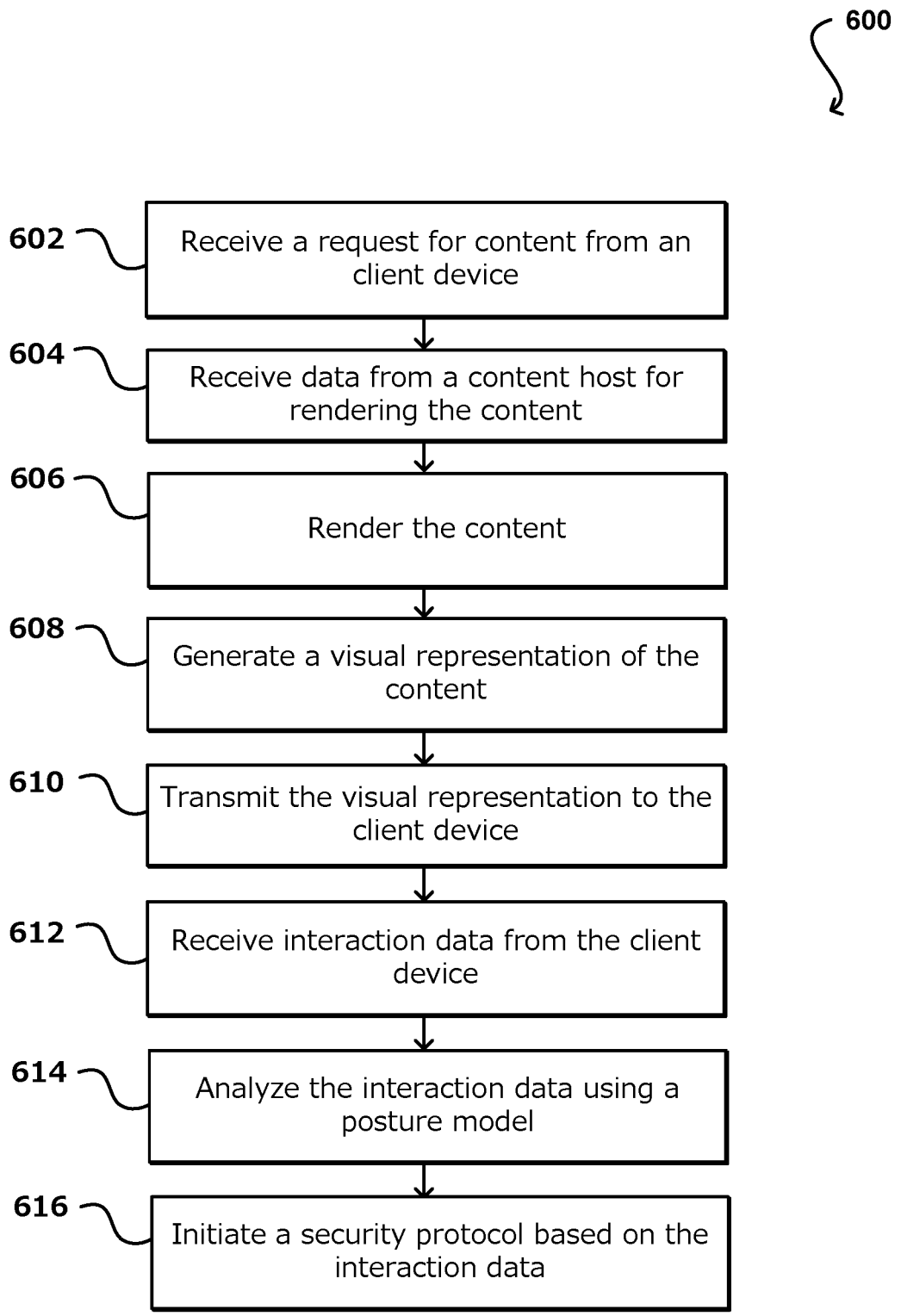
FIG. 6 illustrates an example process for posture based device security, in accordance with various embodiments.

FIG. 6 illustrates an example process 600 for posture based device security, in accordance with various embodiments. It should be understood that there can be additional, fewer, or alternative steps performed in similar or alternative orders, or in parallel, within the scope of the various embodiments unless otherwise stated. In this example, a request for content is received 602 from a client device. This can be received, for example, to an interface layer of a resource provider or service provider environment, for example, which is configured to allocate resources to generate the content to be transmitted to the requesting (or destination) client device. As mentioned, the client may be seeking content from a content host. However, this request may be intercepted by a trusted component that sends a request to the content host on behalf of the client device. Thus, data from the content host is received 604, for example at the trusted component, for rendering the content requested by the client device. The content is then rendered 606, such as at the trusted component. A visual representation of the content is generated 608 and transmitted 610 to the client device. Thus, for example, instead of receiving the data for rendering the content from the content host, the client device receives image data of a visual representation of the content. A user may still interact with the client device, generating interaction data. In some embodiments, some interaction data is generated by the client device without intervention from the user. Interaction data is then received 612, for example at the trusted component. The interaction data can be analyzed 614 using a posture model. As described above, a posture model may sample interaction data associated with an authorized user. A security protocol may be initiated 616 based at least in part of the interaction data. For example, if the interaction data deviates from the posture mode or otherwise indicates aberrant behavior, the security protocol may be initiated, which may include one or more authentication steps among other security measures.

Figure 7:
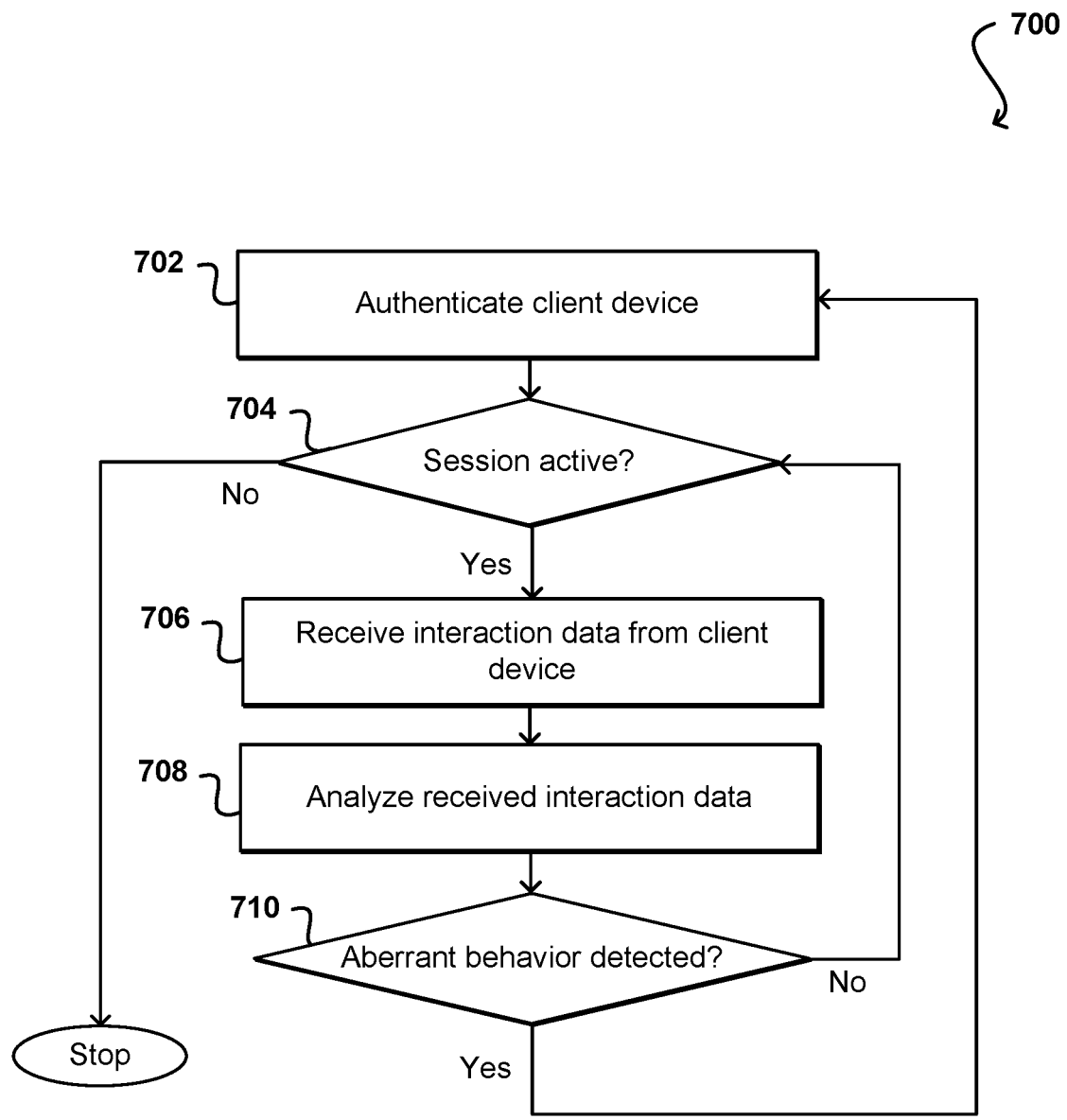
FIG. 7 illustrates an example process for monitoring interaction data for posture based device security, in accordance with various embodiments.

FIG. 7 illustrates an example process 700 for monitoring interaction data for posture based device security, in accordance with various embodiments. In this example, a client device may be authenticated 702 using, for example, a primary authentication layer. This may include requiring credentials such as a username and password to access a Web page, receive content, or any other service associated with a content provider or Website. Once the client device is authenticated, interaction data from the client device may be monitored. For example, it can be determined 704 whether a session is still active. If the session is no longer active, such as when a user signs out or the session is otherwise terminated, the process can stop. If the session is active, interaction data can be monitored for security and as means of continuous authentication. Thus, interaction data is received 706 from the client device and analyzed 708. Based on the analysis, it can be determined 710 whether aberrant behavior is detected. In this example, if aberrant behavior is detected, the client device may be authenticated 702 again through the same or a different authentication protocol to continue the session. This may be done as an extra layer of security. However, if aberrant behavior is not detected, the interaction data continues to be monitored as long as the session is active. This process continues until, for example, interaction data is no longer detected.

Figure 8:
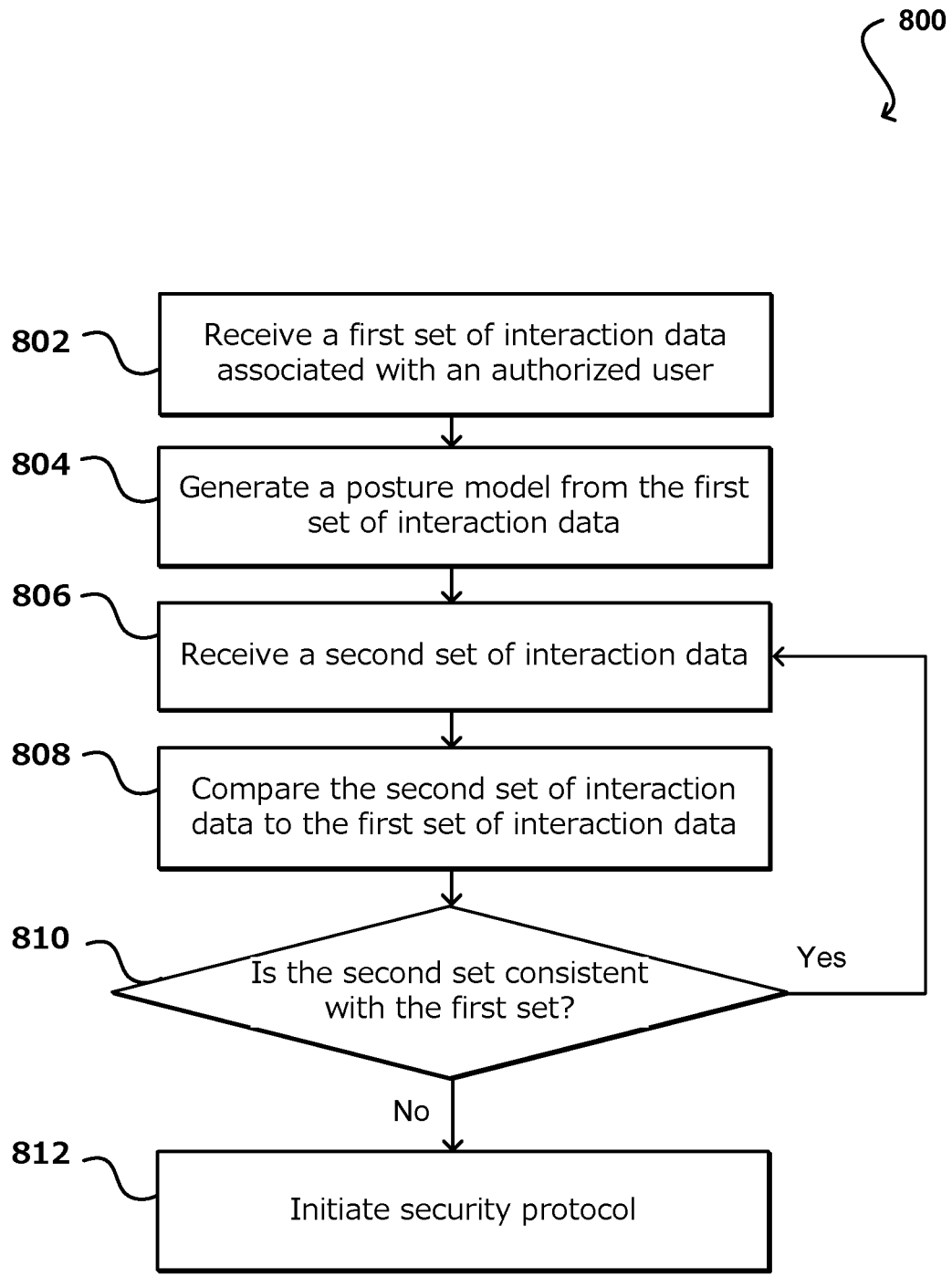
FIG. 8 illustrates another example process for monitoring interaction data for posture based device security, in accordance with various embodiments.

FIG. 8 illustrates an example process 800 for monitoring interaction data for posture based device security, in accordance with various embodiments. In this example, a first set of interaction data associated with an authorized user may be received 802, for example at a trusted component such as a content provider or a resource provider. A posture model can be generated 804 from the first set of interaction data. A second set of interaction data may be received 806 at a later time, and compared 808 to the first set of interaction data. The second set of interaction data may represent the most recent interaction data received from the client device and may be received in real time. It can then be determined 810 whether the second set of interaction data is consistent with the first set of interaction data or the posture model. In some embodiments, being consistent may include certain parameters of the second set of interaction data falling within an acceptable range as determined by the corresponding parameters in the first set of interaction data. What is designated as consistent can be determined based on the particular implementation of the present disclosure. If it is determined that the second set of interaction data is consistent with the first set of interaction data, the monitoring may continue and the process 800 may loop back to receiving 806 an additional second set of interaction data. If the second set of interaction data is not consistent with the first set of interaction data, a security protocol may be initiated 812. As discussed, the security protocol may include a variety of different steps depending on the particular implementation of the present disclosure.

Figure 9:
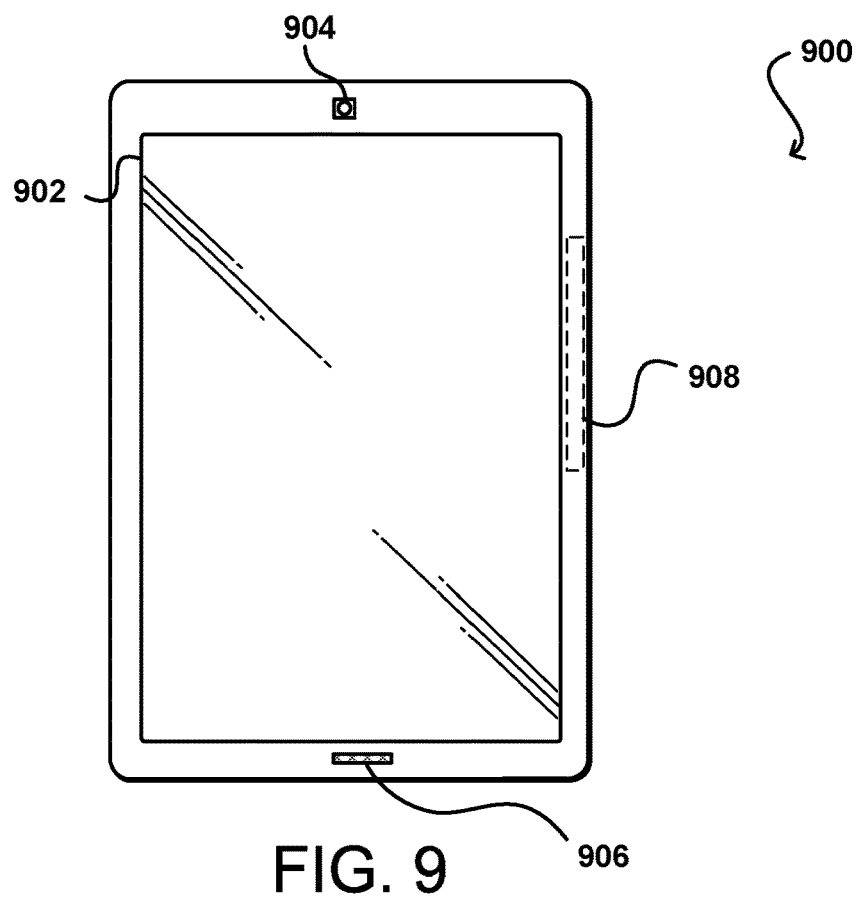
FIG. 9 illustrates an example device that can be used to implement aspects of the various embodiments.

FIG. 9 illustrates an example electronic user device 900 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 900 has a display screen 902 on the front side, which under normal operation will display information to a user facing the display screen (e.g., on the same side of the computing device as the display screen). The computing device in this example includes at least one camera 904 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 900 also includes at least one microphone 906 or other audio capture device capable of capturing audio data, such as words or commands spoken by a user of the device. In this example, a microphone 906 is placed on the same side of the device as the display screen 902, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 900 also includes at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) 908 or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 10:
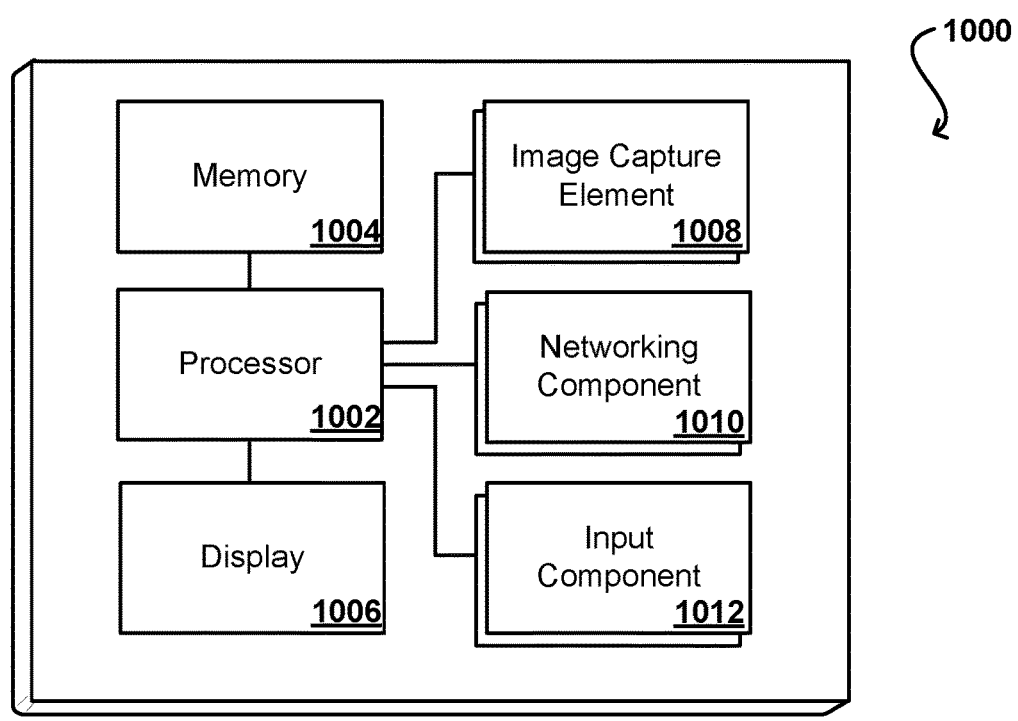
FIG. 10 illustrates example components of a client device, in accordance with various embodiments.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one image capture element 1008 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 1000 of FIG. 10 can include one or more communication or networking elements 1010, such as a Wi-Fi, Bluetooth, RF, wired, or wireless communication system. The device in many embodiments can communicate with a network, such as the Internet, and may be able to communicate with other such devices. In some embodiments the device can include at least one additional input component 1012 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1000 also can include at least one orientation or motion sensor or component. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As an example, a computing device such as that described with respect to FIG. 9 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 11:
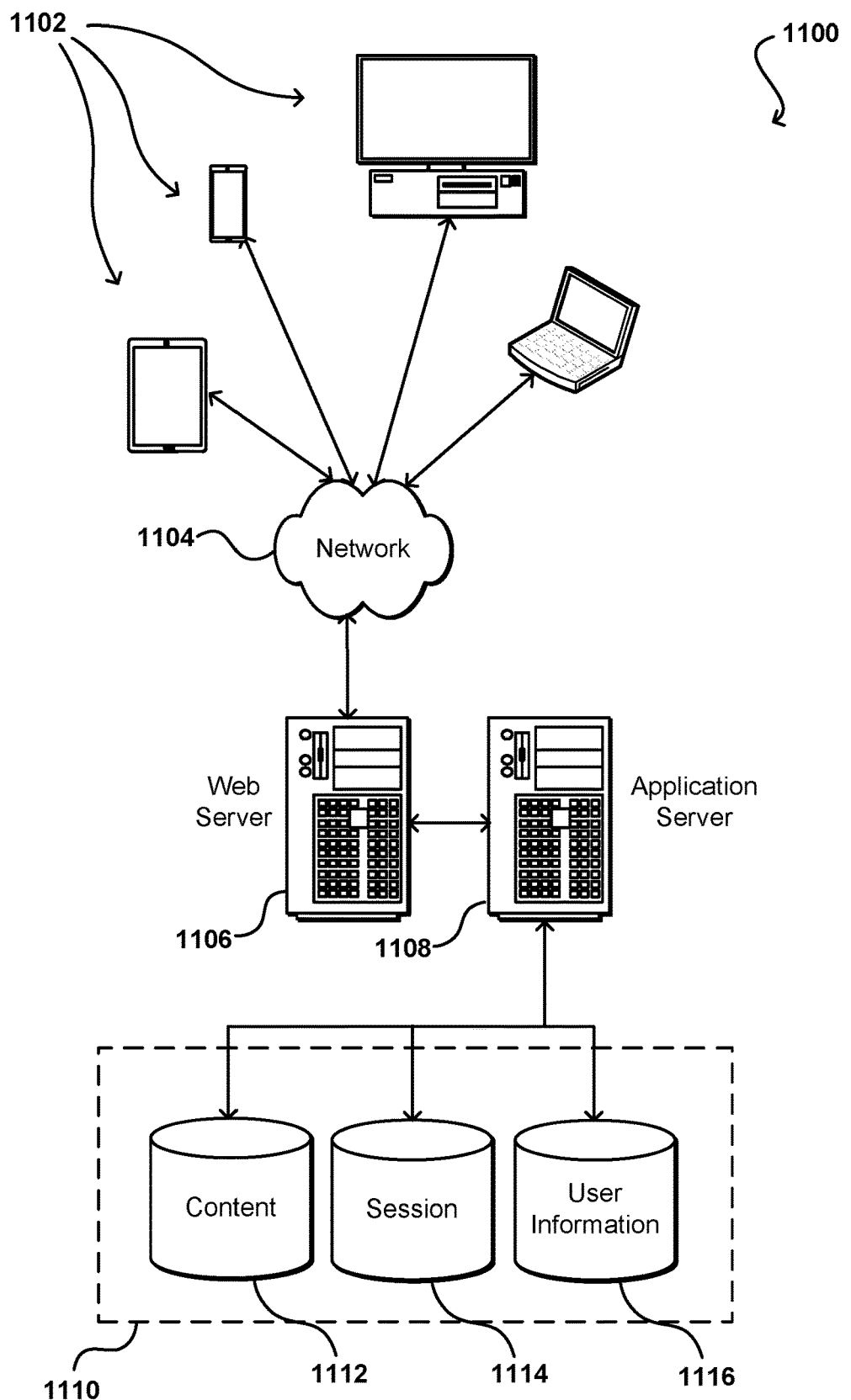
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1102. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program services, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   accessing a posture model trained using examples of trusted interaction data associated with a user account, the posture model including a neural network trained to classify new interaction data as acceptable or aberrant behaviors;
   rendering, at the resource provider environment, a visual representation of first electronic content requested by a client device previously authenticated for the user account;
   transmitting the visual representation of the first electronic content from the resource provider environment to the client device;
   receiving, at the resource provider environment, interaction data from the client device, the interaction data associated with navigation or usage of the visual representation of the first electronic content;
   rendering, at the resource provider environment, a visual representation of second electronic content in response to the interaction data;
   transmitting the visual representation of the second electronic content from the resource provider environment to the client device;
   analyzing the interaction data using the trained posture model; and
   initiating a security protocol for securing the client device based on a determination that the interaction data is associated with aberrant behavior.

2. The computer-implemented method of claim 1, further comprising:
   receiving a first request from the client device for the first electronic content; and
   transmitting a second request for the first electronic content to a content provider.

3. The computer-implemented method of claim 2, further comprising:
   detecting, based on the interaction data, a third request, the third request sent from the client device and received by the content provider; and
   initiating the security protocol based on detecting the third request.

4. The computer-implemented method of claim 1,
   wherein the trusted interaction data is received during the same session as the interaction data or during a previous session.

5. The computer-implemented method of claim 1, wherein the interaction data includes a user input data, a second request, or communications.

6. The computer-implemented method of claim 5, wherein the user input data is associated with a scroll pattern, scroll speed, touch pressure, touch duration, pointer movement, typing pattern, typing speed, zoom pattern, element selection pattern, action frequency, typing error rate, swipe angle, or touch positions.

7. The computer-implemented method of claim 1, wherein the interaction data includes a request to upload content to or download content from the client device.

8. The computer-implemented method of claim 1, further comprising:
   authenticating the client device via a primary authentication layer; and
   repeatedly receiving interaction data received from the client device and analyzing the interaction data using the posture model as a secondary authentication layer.

9. The computer-implemented method of claim 1, wherein the security protocol includes:
   issuing an authentication challenge to the client device;
   receiving credentials from the client device in response to the authentication challenge; and
   authenticating the client device using the credentials.

10. The computer-implemented method of claim 1, further comprising:
    initiating a first security protocol upon receiving interaction data associated with a first type of aberrant behavior; and
    initiating a second security protocol upon receiving interaction data associated with a second type of aberrant behavior.

11. A computing system, comprising:
    at least one processor; and
    memory including instructions that, when executed by the at least one processor, cause the system to:
      access a posture model trained using examples of trusted interaction data associated with a user account, the posture model including a neural network trained to classify new interaction data as acceptable or aberrant behaviors;
      render, at the resource provider environment, a visual representation of first electronic content requested by a client device previously authenticated for the user account;
      transmit the visual representation of the first electronic content from the resource provider environment to the client device;
      receive, at the resource provider environment, interaction data from the client device, the interaction data associated with navigation or usage of the visual representation of the first electronic content;
      render, at the resource provider environment, a visual representation of second electronic content in response to the interaction data;
      transmit the visual representation of the second electronic content from the resource provider environment to the client device;
      analyze the interaction data using the trained posture model; and
      initiate a security protocol for securing the client device based on a determination that the interaction data is associated with aberrant behavior.

12. The computing system of claim 11, wherein the instructions when executed further cause the system to:
    authenticate the client device via a primary authentication layer; and
    repeatedly receive interaction data received from the client device and analyzing the interaction data using the posture model as a secondary authentication layer.

13. The computing system of claim 12, wherein the posture model comprises a plurality of parameters that represent, respectively, a plurality of device interaction characteristics of an authorized user associated with the user account.

* * * * *